Figure 1:
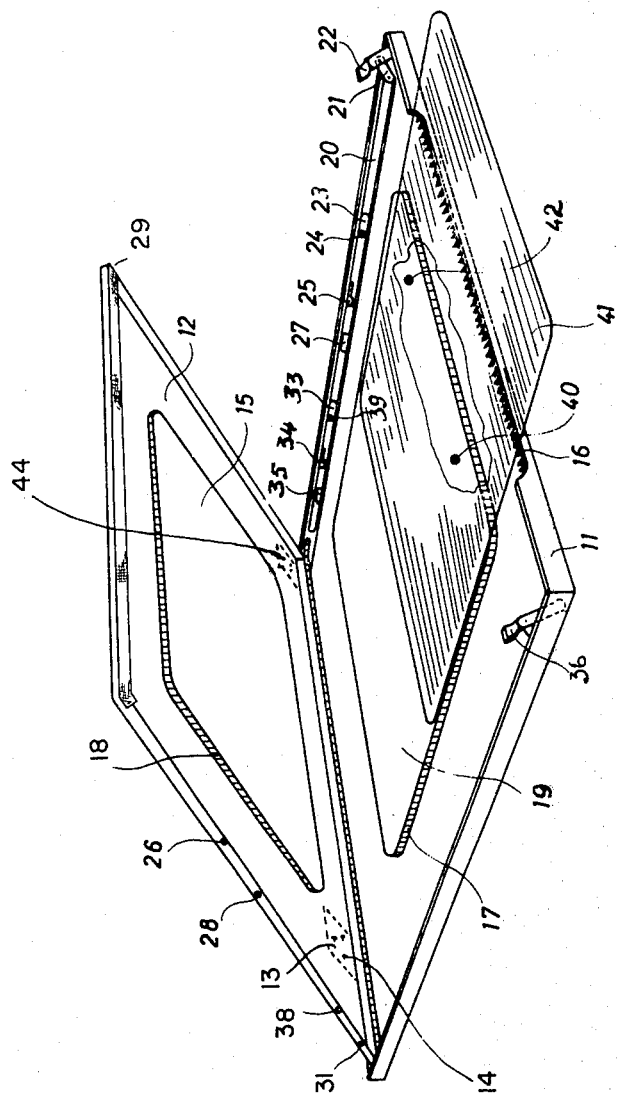

United States Patent [19]
Stievenart et al.

[11] 3,964,107
[45] June 22, 1976

[54] RADIOGRAPHIC FILM CASSETTE
[75] Inventors: Emile Frans Stievenart, Hoboken;
Leo Paul Van Bouwel, Mortsel;
Hendrik Sylvester Plessers,
Boechout, all of Belgium
[73] Assignee: AGFA-GEVAERT N.V., Mortsel,
Belgium
[22] Filed: Apr. 1, 1974
[21] Appl. No.: 456,859

Related U.S. Application Data
[62] Division of Ser. No. 319,062, Dec. 27, 1972, Pat. No. 3,836,783.

[30] Foreign Application Priority Data
Dec. 29, 1971 United Kingdom............... 60344/71

[52] U.S. Cl.............................. 250/468; 250/475; 250/481
[51] Int. Cl.².......................................... G11B 1/00
[58] Field of Search .......... 250/468, 470, 471, 475, 250/476, 481

[56] References Cited
UNITED STATES PATENTS
3,105,903  10/1963  Sano et al. ......................... 250/468
3,591,804  7/1971  Minasian............................ 250/471

*Primary Examiner*—Davis L. Willis
*Attorney, Agent, or Firm*—William J. Daniel

[57] ABSTRACT

A radiographic film cassette suited for being used in combination with a daylight unloading system is presented. It comprises a cover and a bottom frame which are hingedly connected to each other in such a way that not only a rotation at the hinges occurs, but also a lifting up of the cover near the hinges. In this way the sheet of X-ray material becomes completely free. Further, two deformable pins are provided in the bottom part in order to permit the air to flow under the sheet, avoiding thereby a sticking of the latter to the screens. The cassette is advantageously used with a simple unloading device, placed in front of the entrance slit of a processing machine; the unloading device itself may be supplementarily equipped with means to print identification data on the sheet of X-ray material.

8 Claims, 6 Drawing Figures

RADIOGRAPHIC FILM CASSETTE

This is a division of Ser. No. 319,062, filed Dec. 27, 1972, now U.S. Pat. No. 3,836,783.

This invention relates to a radiographic film cassette and more particularly to a radiographic film cassette intended for use in an apparatus for automatically unloading the cassette and feeding the exposed X-ray sensitive sheet material into the entrance slit of an automatic processing machine.

In particular the invention concerns a cassette permitting an automatic unloading in daylight by means of simple mechanical means.

Several systems for automatically unloading X-ray cassettes in daylight have already been described. They generally consist of magazines that temporarily stock the cassettes to be unloaded and position them in front of an unlocking mechanism of an unloading station whereupon the exposed film sheet is gripped and introduced between a pair of rollers, guiding said film sheet over a discharge passage towards the entrance slit of an automatic processing machine for further processing. A description of such apparatus can be found in United Kingdom Pat. Specification Nos. 961,439 filed Jan. 12, 1961 and 961,440 filed July 21, 1961 both by Gevaert Photo-Producten N.V.; a cassette to be used in combination with said apparatus is described in United Kingdom Pat. Specification No. 961,437 filed June 30, 1960 by Gevaert Photo-Producten N.V.

Although the apparatus described in the above-mentioned patents suit very well in practice when quantities of X-ray film sheets are to be processed, a great deal of their importance gets lost when the processing machine is only intermittently used or when decentralized processing departments offer more opportunities.

The present invention aims at providing a cassette which permits a daylight unloading of the X-ray sensitive sheet material without necessity of recurring to expensive or rather complicated apparatus.

The invention further aims at providing a quite simple identification system, which may be used advantageously in combination with a cassette according to the invention.

According to the invention the radiographic film cassette comprises two frames which are hingedly connected to each other by means of hinge means at one edge and which can be locked together by means of appropriate locking means, wherein at least one of the frames is connected to the hinge means through a yieldable member, urging the two frames together at their hingedly connected edges, and wherein the locking means are so arranged that, upon opening the cassette, they are capable of moving the two frames from each other at the corresponding edges near the hinge means over a distance which is greater than in case both frames were rigidly connected to said hinge means.

Figure 2:
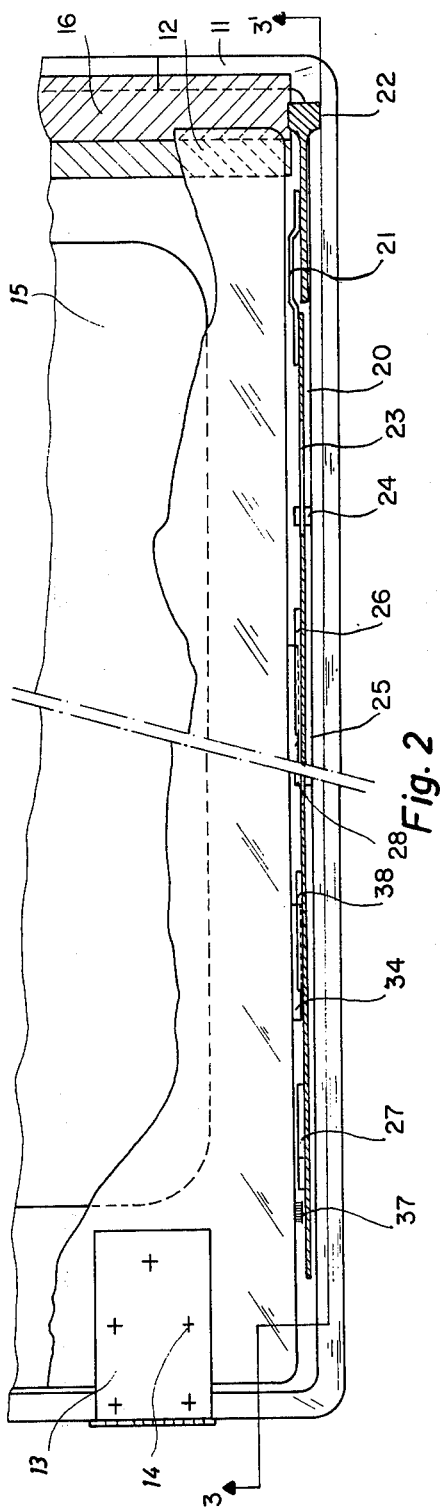
Figure 3:
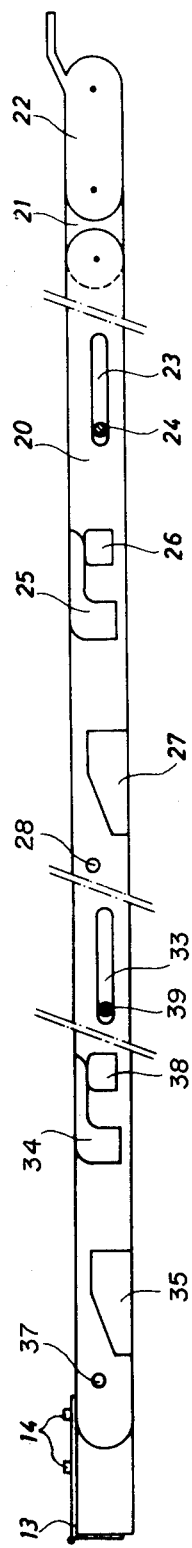
Figure 4:
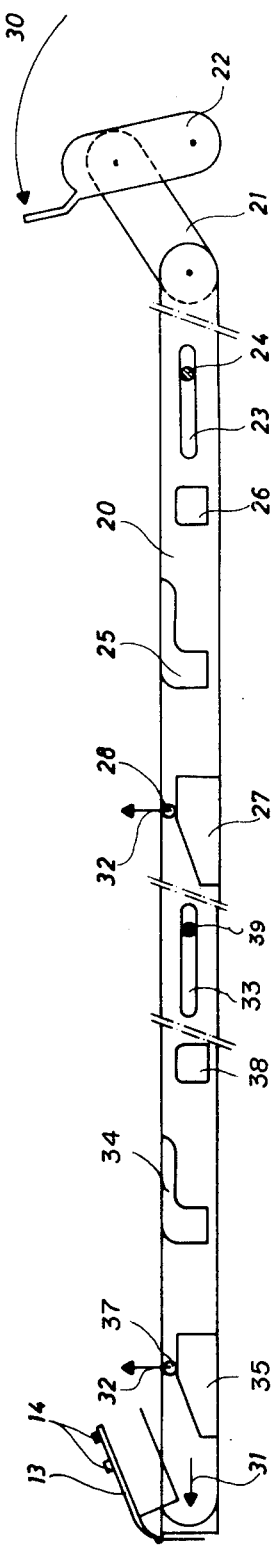
Figure 5:
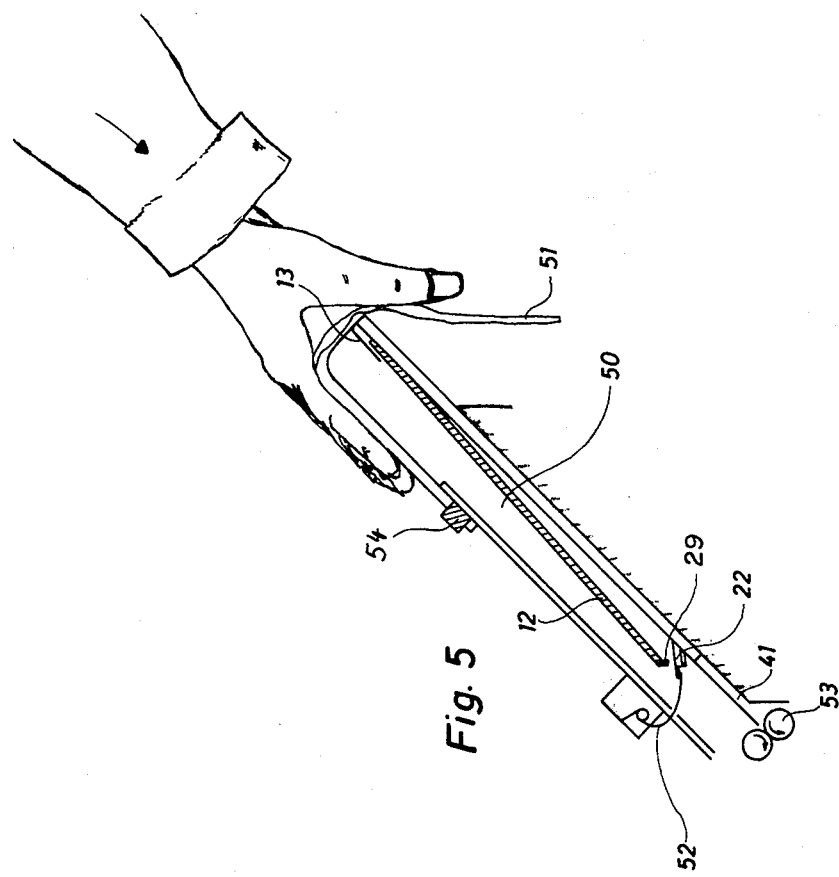
Figure 6:
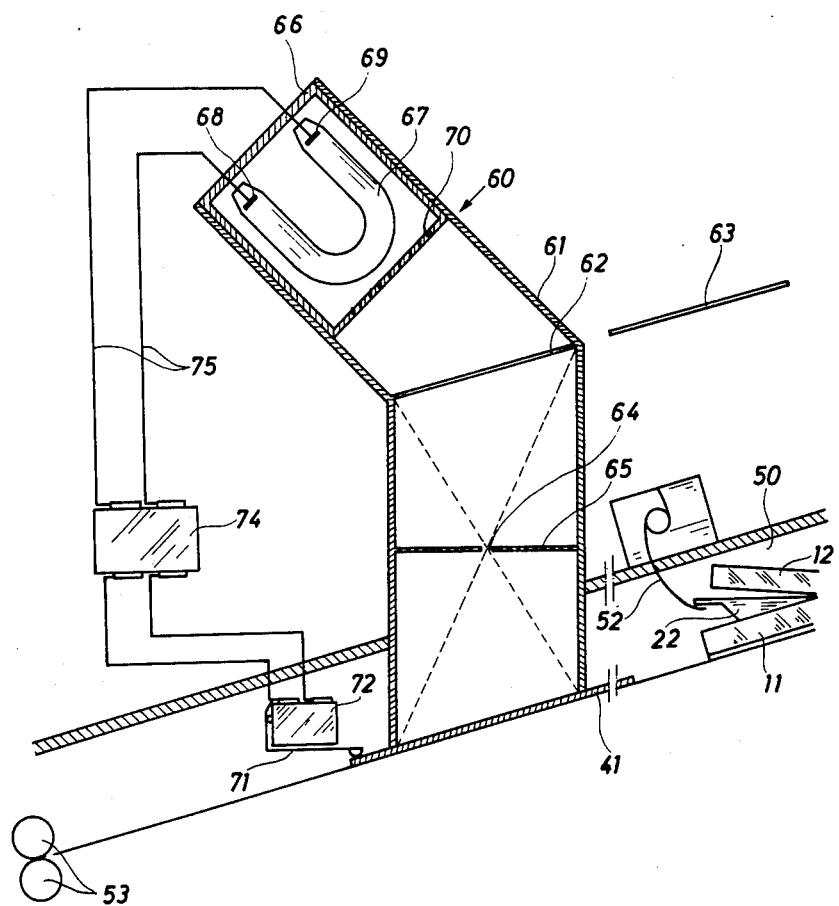

The construction and the working principle of the cassette will be described and explained in the light of a preferred embodiment presented in the FIGS. 1 to 6 in which:

FIG. 1 shows a perspective view of the cassette in opened position,

FIG. 2 presents a partial view of the upperside of the closed cassette,

FIGS. 3 and 4 show the locking mechanism respectively in locked and unlocked position according to the section line 3-3' of FIG. 2, FIG. 5 illustrates the mechanism for unloading the cassette, FIG. 6 shows a cross-sectional view of a preferred embodiment of an apparatus used for identification purposes in combination with the cassette according to the invention.

As can be seen in FIG. 1 the cassette consists of a bottom frame 11 and a cover 12 which are hingedly joined together by means of hinges 13 and 44. A pair of intensifying screens 15 and 19 are provided at the bottom 11 and the cover 12 and are supported by means of sheets of elastic material 17 and 18. In the intensifying screen 19 deformable pins 40 and 42 are provided in corresponding openings which lift the sheet of X-ray sensitive material 41 in order to permit air to flow under it and to prevent same from sticking to said screens when opening the cassette. A part of the front edge of the bottom plate 11 is cut away so that, when bringing the cassette in tilted position with its front side directed downwards, the X-ray sensitive sheet material 41 is able to slide softly through the opening. Said opening is masked by strips of felt or similar material 16 and 29 attached to the front of both the cover and the bottom plate to secure the light-tightness of the cassette when the latter is in locked position. Further are provided locking and unlocking means 20 to 28, in order to prevent an undesired opening of the cassette during operation, and to exert a certain pressure upon the sheet of X-ray sensitive material 41 for maintaining a stable position during exposure of the latter.

In order to illustrate the position of the hinges, FIG. 2 represents a partial view of the upper side of the closed cassette. The hinges 13 and 44 made of spring steel are fixed to the cover by means of five rivets 14 in such a way that a part sufficiently long to guarantee the necessary resilience between the cover and the axis of the hinges is maintained. The other part of said hinges is fixed to the bottom frame by conventional means known in the art.

FIG. 3 shows a side-view of the locking mechanism in locked position according to the section line 3-3' of FIG. 2. This mechanism consists of a sliding lath 20 provided at both sides of the cassette situated between the overlapping of the cover and the bottom and joined by means of a lath 21 to a lever 22.

In the sliding lath 20 two slots 23 and 33 are provided for permitting the pins 24 and 39 fitted on the inner side of the longitudinal wall of the bottom frame to guide said sliding lath 20 in a manner so as to run parallel with said bottom frame. On said sliding lath 20 means are fitted for locking the cover to the bottom plate. So are provided the grips 25 and 34 which in locked position grip the notches 26 and 38 attached to the inner side of the longitudinal wall of the bottom frame. Further are provided the cams 27 and 35 which upon unlocking open the cassette by pushing upwards the pins 28 and 37 situated on the outer side of the longitudinal wall of the cover.

FIG. 4 shows the position of the locking mechanism in unlocked position. When shifting the lever 22 in the sense denoted by the arrow 30, the sliding lath 20 moves in the direction 31 releasing the noches 26 and 38. Moreover, the cams 27 and 35 which have a partly slanting front side engage the pins 28 and 37 and lift the latter in the sense of the arrows 32 causing the cover to move upwards. The elasticity of part of the hinges 13 and 44 connected to the cover provides that said cover not only performs a rotation around the axis of said hinges but also executes a vertical lifting-up movement so that the hinging end of the cover no longer exerts a pressure upon the sheet of X-ray film. The interesting advantage resulting herefrom lies in the fact that the rear part of the sheet of X-ray film becomes completely clear from the screens.

The way to use the cassette in combination with an automatic processing machine is illustrated in FIG. 5. The cassette is introduced into a kind of tunnel 50, the upper side of it being provided at its upper extremity with means 54 whereby one extremity of a light-tight curtain 51 is fixed to the apparatus. This curtain is spread over the cassette after the cassette has been introduced into the tunnel. Then the levers 22 and 36 make contact with a corresponding resilient rabbet 52. By further pushing, the rabbet 52 lifts the levers 22 and 36 so that the cover 12 becomes unlocked and the X-ray sensitive material 41 is forwarded towards a pair of rollers 53 which feed it to the entrance slit of the processing machine. As the rabbet 52 extends over the complete width of the tunnel 50 and by making the light-tight curtain sufficiently long, no limitations as to the width and length of the cassettes exist and all current sizes may easily and safely be used in connection with this device.

As can be seen in FIG. 6, the opening station at the entrance slit of the processing machine may advantageously be equipped with a simple identifying means, that is to say, a small photographic exposure device, by means of which identification data may be exposed on the film before processing.

For this purpose, the sheet of X-ray sensitive material 41 passes under the outlet opening of an exposure device 60 situated after the opening station provided at the entrance of the processing machine.

The said exposure device 60 comprises a housing 61 of preferably rectangular section which is composed of two bodies forming an angle with each other. In the bisector plane of this angle is provided a slide 62 in which data carrying means, for example a small, semi-translucent sheet of paper 63 may be slid. On sheet 63 the necessary data may be type-written and it is introduced into the slide 62 with the data carrying surface turned in downward direction. The vertical part of the housing 61 is in fact a small pinhole camera, the pinhole 64 being provided in a screen 65.

The lighting unit 66, mounted in the housing 61 consists mainly of a flash-tube 67, provided with electrodes 68 and 69 and has an aperture 70 through which radiant energy may be projected into the housing 61. Upon energizing said flash tube 67, light is thus projected through the data carrying means 63, now housed in slide 62, and further through pinhole 64 towards the exit of housing 61, where it is absorbed on an area of the X-ray sheet material 41. Preferably, the exposure occurs near one of the edges of the X-ray sheet material 41 and particularly on an area of the leading edge thereof.

Exposure of supplementary data on said sheet of X-ray sensitive material 41 may be done automatically in a very simple way. To this end, a microswitch 72 is provided in the tunnel, leading to the processing apparatus. The arm 71 of said microswitch may be lifted easily by the front-edge of the X-ray sensitive material 41, causing an internal contact (not shown) to close, so that a switching action occurs in the power supply station 74 of the flash tube 67. In this way, said flash tube ignites, because energy is transferred through the wires 75 to its electrodes 68 and 69. The power supply station 74 for the flash tube 67 may be of any conventional type and may be operated by battery or by the mains as well. As such devices are sufficiently known by those skilled in the art, they need no further explanation.

From the foregoing, it may be concluded that a completely new daylight unloading system, together with an identification system, both of extreme simplicity have been devised, which may be adopted for both small table-top processors and high-speed processing apparatus which run fully automatically.

The need for processors to be installed, at least with their loading side, in a darkroom is completely undone in this way. Small table-top processors, which are very well suited for a decentralized functioning and which may even be installed in an operating room, permit the continuous control during surgical activities without need for recurring to externally situated processing machines.

The scope and spirit of the invention, not being limited by the embodiment described hereinbefore, shall be derived from the appended claims.

We claim:

1. An apparatus for unloading under daylight conditions radiographic sheet film cassets of the type having exteriorly projecting cocking levers at their side into a processing apparatus having an entrance slot, comprising a tunnel in communication with said entrance slot for the reception of said cassette, a resilient strip disposed in said tunnel extending substantially over the tunnel width, said strip being fixed along one edge on the tunnel and projecting at the opposite free end into the interior of the tunnel in the path of said cassette locking levers for engagement with said levers as said cassette is introduced into said tunnel to open said cassette for the removal of the exposed film from the cassette and delivery to said entrance slot and light screening means to prevent ambient light from entering into said tunnel after said cassette is introduced therein.

2. An apparatus according to claim 1, in which said elongate strip is formed by a leaf spring.

3. An apparatus according to claim 1, in which the tunnel is mounted in an inclined position in order to permit the sheet of radiographic film to fall out of the cassette under the force of gravity.

4. An apparatus according to claim 1, wherein sheet feeding means are disposed in said tunnel adjacent said entrance slot to feed said exposed sheet to said slot.

5. An apparatus according to claim 1, in which means is provided to mark each sheet of radiographic film with identification data.

6. An apparatus according to claim 5, in which said marking means comprise a light-tight housing having an outlet opening coinciding with the path of the film sheet between said cassette and said entrance slot, a housing for data carrying means, a light source for illuminating said data carrying means and projecting means for projecting the image of said data carrying means onto said sheet of radiographic film material.

7. An apparatus according to claim 6, including means actuated by the leading edge of said film sheet and connected to said light source for operating the latter.

8. An apparatus according to claim 6, in which said light source is a flash tube.

* * * * *